United States Patent
Rosenschild et al.

(10) Patent No.: US 11,317,301 B2
(45) Date of Patent: Apr. 26, 2022

(54) SYSTEMS AND METHODS FOR A MULTIPLE-OPERATOR DISTRIBUTED ANTENNA SYSTEM

(71) Applicant: CommScope Technologies LLC, Hickory, NC (US)

(72) Inventors: Klaus Uwe Rosenschild, Donauwörth (DE); Arndt Paul Pischke, Huisheim (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/076,644

(22) Filed: Oct. 21, 2020

(65) Prior Publication Data

US 2021/0153034 A1 May 20, 2021

Related U.S. Application Data

(60) Provisional application No. 62/936,771, filed on Nov. 18, 2019.

(51) Int. Cl.
*H04W 16/32* (2009.01)

(52) U.S. Cl.
CPC .................................. *H04W 16/32* (2013.01)

(58) Field of Classification Search
CPC ... H04W 16/22; H04W 16/32; H04W 88/085; H04W 80/08; H04W 88/12; H04B 7/0608; H04B 7/024
See application file for complete search history.

(56) References Cited

U.S. PATENT DOCUMENTS

| | | | |
|---|---|---|---|
| 9,312,938 B2 | 4/2016 | Oren et al. |
| 9,419,837 B2 | 8/2016 | Stapleton et al. |
| 10,003,977 B2 | 6/2018 | Kruh et al. |
| 2008/0058018 A1 | 3/2008 | Scheinert |

(Continued)

FOREIGN PATENT DOCUMENTS

WO 2015054165 A1 4/2015

OTHER PUBLICATIONS

Cisco, "Cisco Vision: 5G—Thriving Indoors", Whitepaper, at least as early as Feb. 10, 2017, pp. 1 through 6, Cisco Public.

(Continued)

*Primary Examiner* — Liton Miah
(74) *Attorney, Agent, or Firm* — Fogg & Powers LLC

(57) ABSTRACT

In one embodiment, a DAS comprises: a master unit configured to receive a signal from a base station, and configured to transmit a signal to the base station; remote antenna units coupled to the master unit and configured to radiate a remote downlink RF signal and receive a remote uplink RF signal; and a controller configured to execute code for a DAS management virtualization system that includes a virtual system controller function configured to establish a plurality of virtual systems and assign physical resources of the DAS to each of the virtual systems. The DAS management virtualization system includes a northbound interface driver that defines a first virtualized DAS operator interface configured to manage a first set of physical resources assigned to a first virtual system, and a second virtualized DAS operator interface configured to manage a second set of physical resources assigned to a second virtual system.

20 Claims, 3 Drawing Sheets

(56) References Cited

U.S. PATENT DOCUMENTS

| | | | |
|---|---|---|---|
| 2008/0134194 A1 | 6/2008 | Liu | |
| 2013/0114963 A1* | 5/2013 | Stapleton | H04W 24/02 |
| | | | 398/115 |
| 2013/0128810 A1* | 5/2013 | Lee | H04W 4/70 |
| | | | 370/328 |
| 2014/0057627 A1* | 2/2014 | Hejazi | H04W 24/08 |
| | | | 455/424 |
| 2014/0233468 A1* | 8/2014 | Hejazi | H04W 52/04 |
| | | | 370/329 |
| 2016/0203080 A1* | 7/2016 | Bert | G06F 11/16 |
| | | | 711/114 |
| 2017/0257151 A1* | 9/2017 | Lange | H04L 12/4641 |
| 2017/0318475 A1* | 11/2017 | Kruh | H04W 16/18 |
| 2020/0036414 A1* | 1/2020 | Shattil | H04B 7/0632 |
| 2020/0196156 A1* | 6/2020 | Kim | H04W 88/085 |

OTHER PUBLICATIONS

Commscope, "C-RAN Antenna Systems and Enterprise DAS", Aug. 12, 2019, pp. 1 through 8, CommScope, https://www.commscope.com/Product-Catalog/Networking-Systems/Pro%E2%80%A6ss-Networking-Systems/C-RAN-Antenna-Systems-and-Enterprise-DAS/.

Fifth Gen, "In-building wireless at MWC: It's all going virtual", Connected REM, Mar. 8, 2018, pp. 1 through 7, https://connectedremag.com/das-in-building-wireless/in-building-wireless-at-mwc-its-all-about-going-virtual/.

Pierson Wireless, "The Case for Multi-operator Small Cells in the Enterprise", Aug. 12, 2019, pp. 1 through 8, https://piersonwireless.com/small-cellodas/the-case-for-multi-operator-small-cells-in-the-enterprise/.

Small Cell Forum, "Multi-operator and neutral host small cells", Document 191.08.02, Dec. 2016, pp. 1 through 35, 5G Americas, Small Cell Forum.

International Searching Authority, "International Search Report and Written Opinion from PCT Application No. PCT/US2020/056709", from Foreign Counterpart to U.S. Appl. No. 17/076,644, dated Feb. 8, 2021, pp. 1 through 16, Published: WO.

\* cited by examiner

SYSTEMS AND METHODS FOR A MULTIPLE-OPERATOR DISTRIBUTED ANTENNA SYSTEM

CROSS-REFERENCE TO RELATED APPLICATIONS

This U.S. Patent Application claims priority to, and the benefit of, U.S. Provisional Patent Application No. 62/936,771 titled "SYSTEMS AND METHODS FOR A MULTIPLE-OPERATOR DISTRIBUTED ANTENNA SYSTEM" and filed on Nov. 18, 2019, which is incorporated herein by reference in its entirety.

BACKGROUND

A typical distributed antenna system (DAS) includes a master unit that is communicatively coupled with a plurality of remote antenna units. Each remote antenna unit can be coupled directly to one or more of the master units or indirectly via one or more other remote antenna units and/or via one or more intermediary or expansion units. A DAS is typically used to improve the coverage provided by one or more base stations that are coupled to the master unit. These base stations can be coupled to the master unit via one or more cables or via a wireless connection, for example, using one or more donor antennas. The wireless service provided by the base stations can include commercial cellular service and/or private or public safety wireless communications. A multiple-operator DAS is a DAS that transports communications signals for more than one wireless communications service provider. That is, the multiple-operator DAS extends wireless communications into a coverage area for multiple wireless network operators.

SUMMARY

In one embodiment, a distributed antenna system (DAS) comprises: a master unit configured to receive a base station downlink radio frequency signal from at least one base station, and configured to transmit a base station uplink radio frequency signal to the at least one base station; a plurality of remote antenna units that are each communicatively coupled to the master unit, the plurality of remote antenna units each configured to radiate a remote downlink radio frequency signal from at least one antenna into a coverage area and to receive a remote uplink radio frequency signal from the coverage area via the at least one antenna; and a controller configured to execute code for a DAS management virtualization system, wherein the DAS management virtualization system includes a virtual system controller function configured to establish a plurality of virtual systems and assign one or more physical resources of the DAS to each of the plurality of virtual systems; wherein the DAS management virtualization system includes a northbound interface driver that defines a first virtualized DAS operator interface configured to manage a first set of the physical resources assigned to a first virtual system, and defines a second virtualized DAS operator interface configured to manage a second set of the physical resources assigned to a second virtual system.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Figure 1:
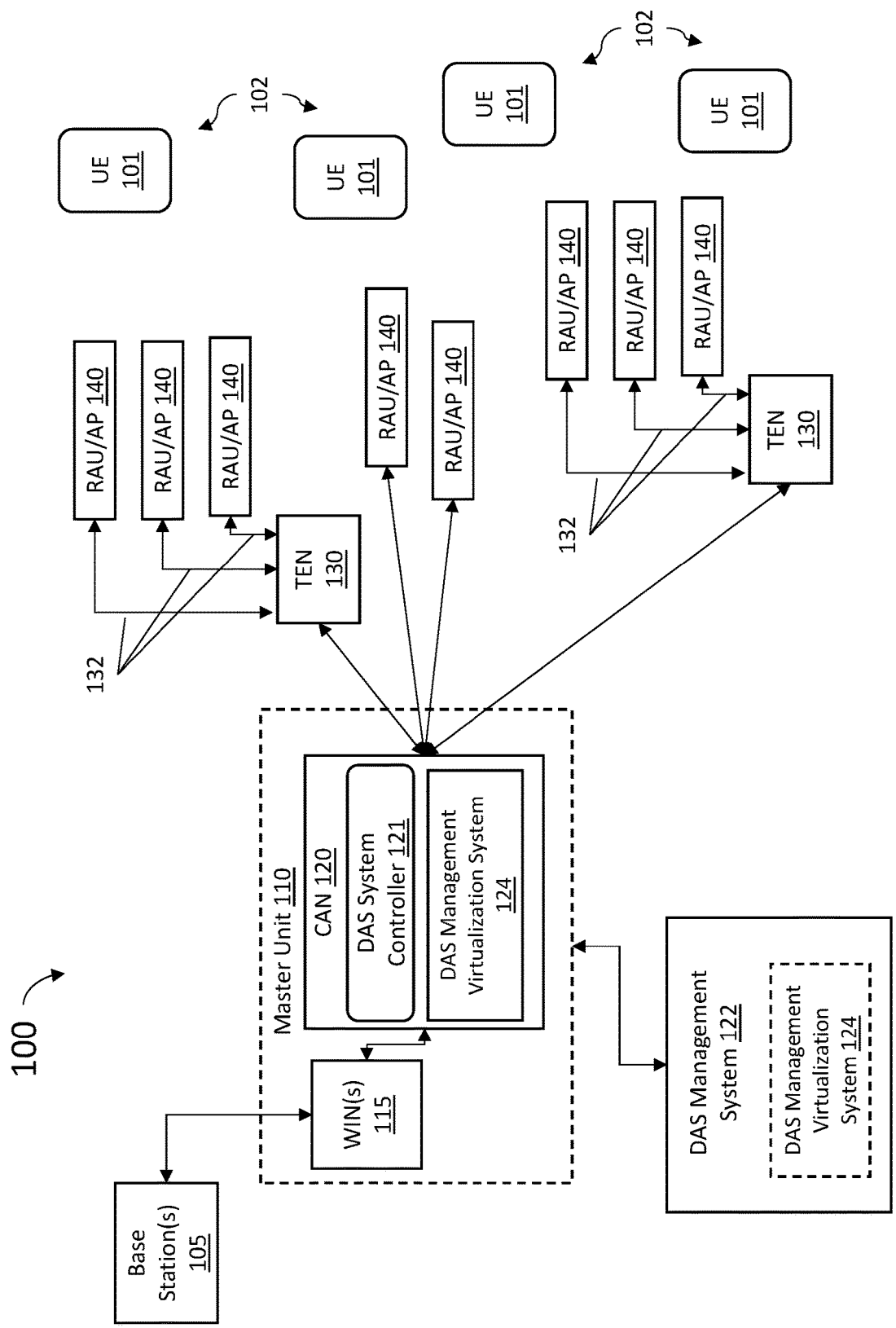
FIG. 1 is a diagram illustrating an example multi-operator DAS embodiment.

FIG. 1 is a diagram illustrating a Distributed Antenna System 100 of one embodiment of the present disclosure. As shown in FIG. 1, in one implementation DAS 100 comprises one or more wide-area integration nodes (WIN) 115, a central area node (CAN) 120, one or more transport extension nodes (TEN) 130, and a plurality of access points (AP) 140 (which may also be referred to herein as remote antenna units (RAU) 140) that transmit and receive mobile radio signals. The WIN 115 and CAN 120 operate in conjunction with each other to implement a distributed master unit (MU) 110 function for DAS 100 that establishes communications with one or more base stations 105. In some embodiments, the WIN 115 resides in a C-RAN hub and carries baseband signals to a campus distribution hub. In the embodiment shown in FIG. 1, the WIN 115 is coupled to one or more base stations 105. The CAN 120 may be located at the campus or building head-end. It digitizes baseband RF signals, combines signals from different operators and distributes them throughout a building or facility. In some embodiments, the TEN 130 distributes signals to a specified portion of a larger facility, for example, to the access points 140 throughout a specific floor or building. The plurality of access points 140 define the remote antenna units (RAU) of the DAS 100 which establish wireless connectivity with the one or more user equipment devices (UE) 101 (such as tablets or cellular telephone, for example) located within a coverage area 102 of the DAS 100. The DAS 100 can use either digital transport, analog transport, or combinations of digital and analog transport for generating and communicating the transport signals between the master unit 110 and the remote antenna units 140.

In the downlink direction, DAS 100 is configured to receive downlink radio frequency signals from the base stations 105. These signals may also be referred to as "base station downlink signals." Each base station downlink signal includes one or more radio frequency channels used for communicating in the downlink direction with user equipment 101 over a relevant wireless air interface. In the uplink direction, DAS 100 is configured to receive respective uplink radio frequency signals from the user equipment 101 within the coverage area of the DAS 100, and transport those signals as "base station uplink signals" to the base stations 105.

In some embodiments, one or more of the WIN 115, CAN 120 and TEN 130 may be communicatively coupled to each other by electrical conductors, optical fibers, or via a backbone network. Typically, each base station downlink signal is received at the WIN 115 from the one or more base stations 105 as analog radio frequency (RF) signals, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The base station downlink signals are digitized or otherwise formatted by the WIN 115 into a digital signal, and the resulting downlink transport signal transported to the CAN 120. The CAN 120 functions as the head-end unit of the DAS 100 and may be used to coordinate the operations of WIN 115, TEN 130 and access points 140. For example, the CAN 120 may operate to forward downlink transport signals to the TEN 130 and receive uplink transport signals from the TEN 130. In some embodiments the CAN 120 implements a switching matrix that provides for switching services carried through the access points 140. In some embodiments the CAN 120 implements functionalities that permit copying received downlink signals to multiple access points 140 destinations, and to combine uplink signals received from multiple access points 140. The CAN 120 may also further include interfaces or other means for providing external access to the DAS 100 (for example, via ONAP as described below).

The DAS 100 may include any number of TEN 130. From the TEN 130, patch cables 132 are distributed to one or more antenna locations where access points 140 are deployed. Each access point 140 receives the base station downlink RF signals, converts the digital signals to analog radio frequency (RF) signals for over-the-air transmission, and broadcasts (radiates) the base station downlink signals as wireless downlink RF signals to user equipment 101 within the coverage area 102 of the DAS 100. It should be understood that the presence of a TEN 130 is optional and that in some embodiments, access points 140 may be coupled directly to the CAN 120 without an intervening TEN 130. Likewise, in some embodiments, the WIN 115 may be omitted as optional. For example, the base stations 105 may be configured to communicate uplink and downlink base stations directly from such a base station to the CAN 120. In other embodiments, the functions of the WIN 115 and CAN 120 may be integrated into a unified, rather than a distributed, Master Unit 110.

Uplink RF signals transmitted by the user equipment (UE) 101 located within the coverage area 102 of the DAS 100 are received by the access points 140, digitized or otherwise converted to digital signals, and received by the TEN 130. These uplink transport signals are formatted by the TEN 130 for transport to the CAN 120. The CAN 120 processes the digital uplink signals received from the TEN 130 for further transport to the WIN 115. This processing may involve, among other things, combining or summing uplink signals received from the multiple access points 140 in order to produce a composite uplink base station signal. The composite base station uplink signal is transported to the WIN 115. Ultimately, composite base station uplink signals are output from the WIN 115 to the one or more base stations 105. In this way, the DAS 100 increases the coverage area available for both uplink and downlink communications between user equipment 101 and the base stations 105.

Coordination of tasks between the WIN 115, CAN 120, TEN 130 and RAU/AP 140 is performed by the DAS system controller 121 on the CAN 120. In some embodiments, the DAS system controller 121 may be implemented by circuitry and/or a processor and memory configured to execute the functions described herein as being performed by either the CAN 120 or DAS system controller 121. In some embodiments, the CAN 120 may be configured to communicate with a DAS management system 122 (such as an ONAP, Open Networking Automation Platform, for example) such as shown in FIG. 1. The DAS management system 122 may be utilized to initiate configuration changes that involve changes on the WIN 115, CAN 120, TEN 130 and RAU/AP 140 (or other resources), while the actual coordination of these activities is performed by the DAS system controller 121. For example, as shown in FIG. 1, the CAN 120 may be in communication with an access point 140 (either directly or via a TEN 130) so that the DAS management system 122 can send commands to the CAN 120 which are used to implement reconfiguration of the access point 140. It should be understood that in some embodiments, the DAS management system 122 can be implemented as a component of the DAS 100 itself, while in other embodiments, it may be implemented by components outside of the DAS 100. In some embodiments, using a DAS Management virtualization system 124 on the external DAS management system 122 could establish a common and public interface also for the function to define a virtual DAS system, which would allow the movement of resources from one virtual DAS system into the other via the public interface. Regardless of where it is implemented, network operators by accessing the DAS management system 122 can send control commands to the CAN 120 to manage and obtain status information about the DAS 100.

As discussed above, one or more of the embodiments presented herein implement a multi-operator platform that virtualizes certain aspects of DAS 100 operation so that each operator is presented with a virtual DAS associated with their utilization of one or more components of the physical DAS 100. More specifically, a network operator will access the functions of the CAN 120 via a DAS management virtualization system 124 that allow the network operator to operate his portion of the DAS 100 in the same way that he would access a pure physical system. The DAS management virtualization system 124 subdivides components and operations of the physical DAS 100 into a plurality of virtual distributed antenna systems (referred to herein as a "virtual system" or "virtual DAS" each associated with a specific service operator).

Figure 2:
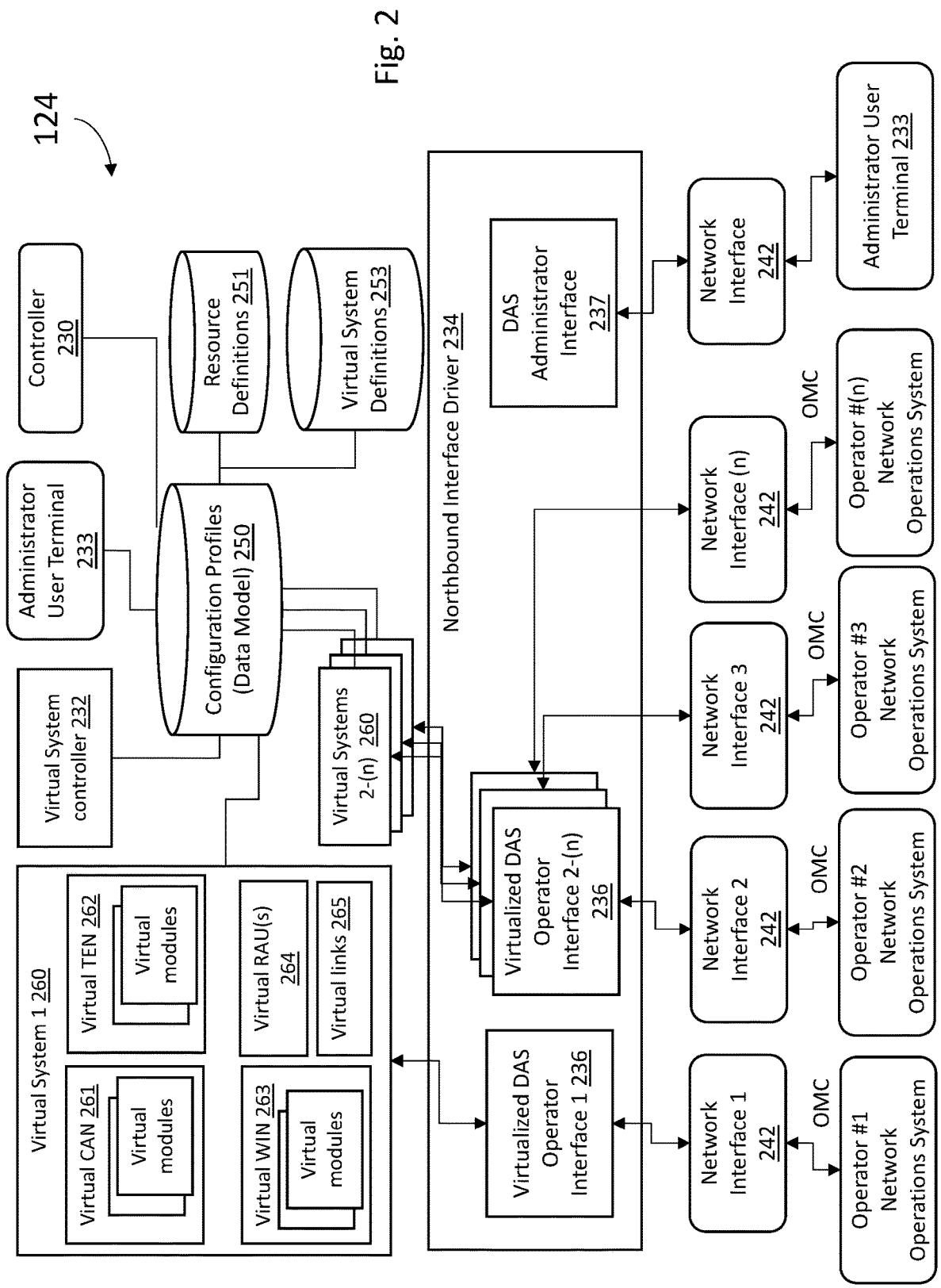
FIG. 2 is a diagram illustrating an example DAS management virtualization system embodiment.

FIG. 2 is a diagram illustrating an example implementation of the DAS management virtualization system 124 which may be used in conjunction with DAS 100. DAS management virtualization system 124 establishes a plurality of virtual systems 260 (shown as virtual systems 1 to (n)), each of which are assigned physical resources of the DAS 100 that network operators are permitted to manage. Each virtual system 260 is independent and invisible from the other virtual systems 260 so that from the perspective of the operator, the resources of DAS 100 assigned to him appear as a DAS dedicated to providing coverage for his particular communications network. It should be understood that any number (n) of distinct virtualization systems may be established.

The DAS management virtualization system 124 includes a controller 230 which may comprise one or more programmable processors coupled to a memory. The controller 230 executes software that is configured to implement the various features and functions described here as being implemented by the DAS management virtualization system 124. In some embodiments, the DAS management virtualization system 124 may be implemented by the master unit 110 (for example by the CAN 120). As such, in some embodiments the controller 230 may comprise the DAS system controller for the DAS 100. In other embodiments, the DAS management virtualization system 124 may be implemented as a function of the DAS management system 122. In such embodiments, the controller 230 may be a component of the DAS management system 122 and further configured to more generally implement the various features described here as being implemented by the DAS management system 122. The DAS management virtualization system 124 further includes a virtual system controller function 232, a northbound interface driver 234, one or more virtualized DAS operator interfaces 236, a DAS administrator interface 237, one or more network interfaces 242, and configuration profiles which may be stored on a data storage hardware device in a database as a data model 250. The virtual system controller function 232 executes the creation, managing and controlling of the virtual systems 260. Data model 250 may include information such as, but not limited to, resource definitions 251 and virtual system definitions 253. Each of these elements of the management virtualization system 124 may at least in part be implemented using code executed by the controller 230, and in some embodiments, electronic circuitry and devices such as memory and storage devices, dedicated circuits, physical layer network interface hardware and ports, and the like.

As mentioned above, virtual systems 260 are each assigned physical resources of the DAS 100 that are presented to the operator of that virtual system as a complete and dedicated DAS which they may configure to extend communications connectivity provided by a base station 105 into a coverage area 102. Within each virtual system 260, the virtual system controller function 232 instantiates virtual components associated with those physical resources assigned to the virtual system 260. For example, the virtual system 1 in FIG. 2 includes the virtualized components of a virtual CAN 261, a virtual TEN 262, a virtual WIN 263 and virtual RAU(s) 264. Each of these define the allocated portion of the respective CAN 120, TEN 130, WIN 115, and RAU/AP 140 physical components of the DAS 100 allocated to virtual system 1. Moreover, the virtual system controller function 232 may instantiate and manage one or more virtual links 265 that interconnect and support communication between the virtual CAN 261, a virtual TEN 262, a virtual WIN 263, virtual RAU(s) 264 in the same manner that CAN 120, TEN 130, WIN 115, and RAU/AP 140 would do so for the physical DAS 100. In some embodiments, each of the virtual components associated with physical resources may comprise virtual modules that when executed implement the particular tasks of the virtual components.

The physical resources of the DAS 100 which may be allocated to virtual systems are defined by resource definitions 251. Resource definitions 251 are accessible by the virtual system controller function 232 and provide an inventory of the assignable physical resources of the DAS 100, the functions of those resources. In some embodiments, resource definitions 251 may further include an indication of whether each assignable physical resource is a sharable resource (i.e., a physical resource that may be utilized by more than one virtual system), or a non-sharable resource (i.e., a physical resource that cannot be utilized by more than one virtual system). Examples of assignable physical resources of the DAS 100 include, but are not limited to, the TEN(s) 130, WIN(s) 115, access points 140, and network interfaces 242 (for example, modems and/or network adapters). Moreover, physical resources within the CAN 120, TEN(s) 130, WIN(s) 115, access points 140 can be assignable to virtual systems such as RF donor (RFD) cards (that receive and process analog RF signals), CPRI digital donor (CDD) cards (that receive and process CPRI digital signals, for example from an operators baseband units (BBU)), Optical (OPT) and copper (CPT) transport cards (which connect to transport links between network elements), Auxiliary transport (AUT) cards (which allow pass-through Ethernet connections to IP endpoints, such as Wi-Fi access points, security cameras, sensors, or other devices), and/or system user interface (SUI) cards (which provide access for embedded controllers within the various components to local control monitors, for example).

At least one user of the DAS management system 122 is assigned the role of an administrator of the DAS 100 for purposes of the DAS Management Virtualization System 124. The administrator, via the virtual system controller function 232, instantiates each virtual system 260 and assigns it to a given operator. The resulting information defining the physical resources assigned to a virtual system 260 and the operator associated with that virtual system 260, is stored as a virtual DAS definition in the virtual system definitions 253. While some physical resources of the DAS 100 need to be shared among several operators, some can be assigned exclusively. For example, resources which may be assigned for exclusive use include RFD cards, WINs 115, TENs 130 and the associated access points 140, links between the TENs 130 and access points 140, RFD cards, amplifiers, modems and network interfaces. In other aspects, each operator may be allocated its own virtual controller that would allow the operator to run software for their virtual system on a processing platform completely independent from other operators.

Physical resources of the DAS 100 which may be shared between different operators include components of the CAN 120, TENs 130 and access points 140 and links between the TENs 130 and access points 140. With respect to components of the RF signal paths (for example amplifiers, modulators, attenuators, analog-to-digital and digital-to-analog converters) each operator is allocated by the administrator a power share within a given band and/or a bandwidth allocation from the total bandwidth capacity. In addition to establishing virtual systems, the administrator can run operations and management (O&M) functions that may globally affect service for all operators. For those operations, the administrator should coordinate the maintenance tasks with the virtual system operators to avoid unplanned service disruptions. In some embodiments, the administrator may run a complete system backup/restore that includes all operator specific configuration information recorded in the data model 250.

In some embodiments, the administrator may logon and access the virtual system controller function 232 from an administrator user terminal 233 connected to, or part of, the DAS management system 122. In other embodiments, as shown in FIG. 2, the DAS Management Virtualization System 124 may implement a DAS administrator interface 237 coupled to a network interface 242 through which the administrator may connect to via a remote administrator user terminal 233 to logon and access the virtual system controller function 232.

While the administrator user role has authority to manage and operate all aspects of the physical system of DAS 100, service provider operators are assigned an operator user role that is given authority over their virtual system or systems. As such, at least one user of the virtual system controller function 232 is assigned the role of an operator of a virtual system established by the administrator. The authority granted to the operator user permits the exercise of management over a virtual system via the virtual system controller function 232, but not over functions that may affect shared resources so as to affect the service/operation of another virtual system. For example, an operator user cannot conduct signal path calibrations, diagnostics, or disable shared resources, as doing so could interfere with communications traffic being carried by the DAS 100 for other virtual systems.

Examples of operations that an operator of a virtual DAS may execute via the virtual system controller function 232 include, obtaining status reports or graphical status indicators for parts of the system that are assigned to their virtual system, defining supervision parameters for the operator specific service (e.g. thresholds, alarm severities), defining services and link services to assigned RFD cards, defining signal sets and assigning the signal sets to access point 140 that are within their virtual system, perform a backup and/or restore of configuration settings for their virtual system, and create additional operator users for their virtual system having different levels of permissions.

In one embodiment, an operator may assign the signal sets of his virtual system through a user interface (such as a graphical user interface) served to them by the virtual system controller function 232. The operator user opens the user interface and may be presented with a graphical representation of their virtual system 260 and the physical resources assigned to his virtual system 260. The operator instructs the virtual system controller function 232 to start a channel scan on his virtual system. The detected signals are stored in the data model 250 with the relevant parameters. As the channel scan is run on an RFD card, the signals can be linked to a component of the virtual system definitions 253 that contains the physical resources that are part of the associated virtual system. Once the signals are detected the operator can define a signal set that is a composition of several signals of the given operator. The operator can utilize the virtual system controller function 232 to assign the signal set to an access point 140 band. Because this access point 140 band may be shared among multiple operators, a shared element of the virtual system controller function 232 defines the share of the access point 140 physical resource (e.g. a percent value, fraction) that is assigned to this operator's virtual system. Similarly, a shared element of the virtual system controller function 232 may be utilized to define a share of the capacity of the communications links between and RFD card and the access point 140 to this operator's virtual system.

With respect to alarms, the operator may receive hardware fault or warning alarms related to the physical resource components that are assigned to their virtual system. The operator only receives those alarms that are related to their service or to the hardware that is part of their virtual system. Alarms and service status information for virtual system of other operators are not visible. In some embodiments, this may be achieved by assigning an alarm instance to components of the virtual system controller function and through static alarm definitions where severity information can be maintained and associated with a given operator.

In some embodiments, the operator may login and access the DAS management virtualization system 124 from a user terminal connected to, or part of, the DAS management system 122. In other embodiments, as shown in FIG. 2, the DAS Management Virtualization System 124 may implement a DAS administrator interface 237 coupled to a network interface 242 through which the operator may connect to via a remote terminal to logon and access the DAS management virtualization system 124.

In some embodiments, user role definitions for administrator and operator users are maintained in the virtual system definitions 253. However, it should be understood that in some embodiments, other user roles may be defined to create users for the DAS Management Virtualization System 124 with a very specific profile of allowed operations. For example, user roles may be established to: execute hardware discovery and join procedures, hardware commissioning and maintenance procedures (such as software updates, system repair, system extension, path calibration, and so forth), alarm management user/operator/role management, northbound interface configuration, perform virtual system management (define virtual systems and operators and assign of virtual system to operators), assign virtual systems to operators, and signal/signal set related operations (channel scan, signal set definitions, assignment signal sets to APs).

As shown in FIG. 2, the DAS Management Virtualization System 124 comprises a northbound interface driver 234 that established one or more virtualized DAS operator interfaces 236 through which operators may access an associated virtual system 260 in order to monitor and control aspects of their virtual system 260 as described herein. The northbound interface driver 234 provides an architecture in which each operator uses their own network and/or computing resources (whether hardware or virtualized) to access their virtual system 260 instances. In some embodiments, each virtualized DAS operator interface 236 may establish a dedicated ethernet socket or be assigned to a specific VLAN in order to facilitate an operator's access to their virtual system 260.

In some embodiments, each virtualized DAS operator interface 236 generates the user interfaces and graphical display screens that are served to the operators accessing the DAS Management Virtualization System 124. In one embodiment, the virtual system controller function 232 accesses the virtual system definitions 253 from the data model 250 to identify each of the physical resources assigned to a given virtual system 260, the corresponding hardware status information for each of those physical resources, and each of the virtual DAS configuration settings and signal sets defined by that virtual system 260's operator. For each virtual system 260, the northbound interface driver 234 functions to route information between the virtual system 260 and the associated virtualized DAS operator interface 236 established for that virtual system's operator. Based on this information, the virtualized DAS operator interface 236 generates the specific user interfaces and graphical display screens served to the operators. In the user interface displayed to an operator, that operator only sees information regarding their virtual system 260 and the physical resources assigned to that virtual system 260. Alarms relevant to the virtual system 260 are forwarded to the operator's network over the established operations and management channel (OMC).

As discussed above, the DAS management virtualization system may include one or more network interfaces 242. Each network interface 242 may comprise a shared modem or network adapter accessed as a shared resource by different operators. Alternatively, multiple network interfaces 242 may be implemented as separate physical interfaces on a single machine, with each operator having access made available via a specific dedicated modem or network adapter. As another alternative, the network interfaces 242 may comprise modem or network adapters on different machines, with each modem or network adapters exclusively connected to a given operator, thus providing enhanced levels of security as operator specific operations are executed on different machines. The physical resource that is assigned to the operator for the network interfaces 242 may include device specific configuration parameters. Where a network interfaces 242 comprises a modem, that modem may be exclusively assigned to an operator. Where a network interface 242 comprises a network adapter (such as a local area network adapter), is may be either exclusively assigned to an operator or alternately shared between multiple operators.

In some embodiments, operators may define connectivity configurations for accessing their virtual system via the northbound interface driver 234. More specifically, each operator may establish its own set of connectivity settings which are recorded to the virtual system definitions 253 and therein associated with their virtual system. Such connectivity data may include IP addresses associated with the operator's operations and maintenance channels (OMC), routing information for the operators OMC IP address, and the network interface 242 configuration setting to be used to couple the operator's network operations system to the DAS Management Virtualization System 124. These configuration setting may specify the protocol to be used over the OMC (for example, Simple Network Management Protocol (SNMP) v2, SNMPv3, an OMC comparable with CommScope's Andrew Integrated Management and Operating System (A.I.M.O.S.), Network Configuration Protocol (NETCONF) or the like). In some embodiments, a network interface 242 may be configured to operate as a client node on the operator's virtual private network (VPN) to provide a secure channel between the DAS 100 and the operator's network. For implementations where a network interface 242 is a shared resource used by multiple operators, then those multiple operators may need to coordinate to agree on the configuration settings. Upon reaching agreement, the administrator may configure the network interface 242 with the agreed upon configuration settings. For a network interface 242 dedicated to a single operator, that operator may be granted rights to configure their interface as desired. In some embodiments, virtual local area network (VLAN) techniques may be implemented that allows carrying multiple separate networks over one physical network interface 242. In such an embodiment, a switch in the northbound interface driver 234 can map the different VLAN IDs to different network adapters.

Figure 3:
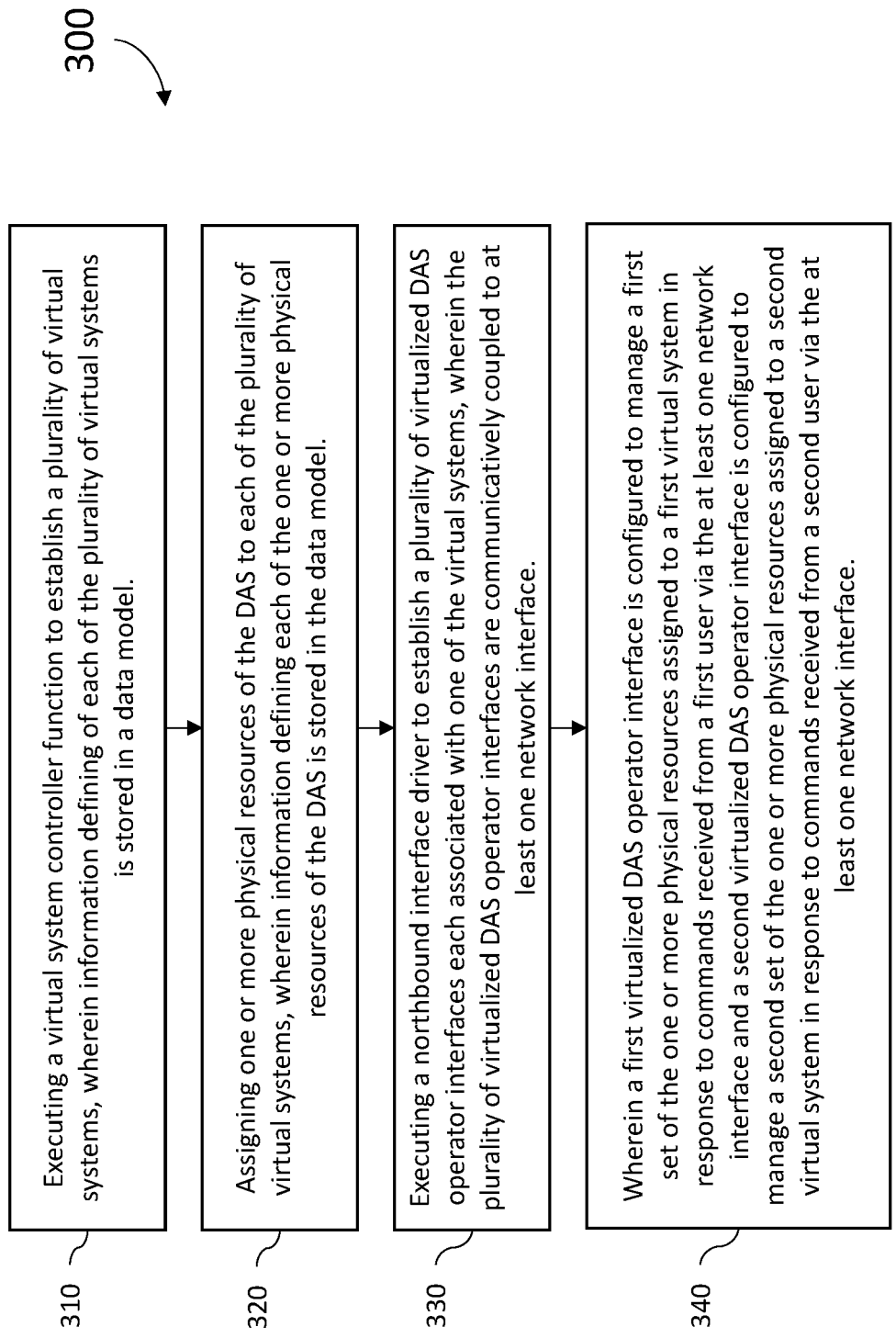
FIG. 3 is a diagram illustrating an example method embodiment for DAS management virtualization.

FIG. 3 is a flow chart illustrating at 300 a method for DAS management virtualization for a DAS such as any of those DAS discussed herein. It should be understood that the features and elements described herein with respect to the method 300 shown in FIG. 3 and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIG. 3 may apply to like named or described elements for any of the other figures and embodiments and vice versa.

The method begins at 310 with executing a virtual system controller function to establish a plurality of virtual systems, wherein information defining of each of the plurality of virtual systems is stored in a data model. As discussed above execution of the virtual system controller function facilitates the creation, managing and controlling of the virtual systems. The data model may include information such as, but not limited to, resource definitions and virtual system definitions as described above. Each of these elements of the management virtualization system, including the virtual system controller function, may at least in part be implemented using code executed by a controller, and in some embodiments, electronic circuitry and devices such as memory and storage devices, dedicated circuits, physical layer network interface hardware and ports, and the like.

The method proceeds to 320 with assigning one or more physical resources of the DAS to each of the plurality of virtual systems, wherein information defining each of the one or more physical resources of the DAS is stored in the data model. Each virtual system is independent and invisible from the other virtual systems so that from the perspective of an operator, the resources of the DAS assigned to them appear as a DAS dedicated to providing coverage for their particular communications network. It should be understood that any number (n) of distinct virtualization systems may be established. Virtual systems may each be each assigned physical resources of the DAS that are presented to the operator of that virtual system as a complete and dedicated DAS which they may configure to extend communications connectivity provided by a base station into a coverage area. Within each virtual system, the virtual system controller function instantiates virtual components associated with those physical resources assigned to the virtual system.

The method proceeds to 330 with executing a northbound interface driver to establish a plurality of virtualized DAS operator interfaces each associated with one of the virtual systems, wherein the plurality of virtualized DAS operator interfaces are communicatively coupled to at least one network interface. The northbound interface driver provides an architecture in which each operator uses their own network and/or computing resources (whether hardware or virtualized) to access their virtual system instances. In some embodiments, each virtualized DAS operator interface may establish a dedicated Ethernet socket or be assigned to a specific VLAN in order to facilitate an operator's access to their virtual system. For each virtual system, the northbound interface driver functions to route information between the virtual system and the associated virtualized DAS operator interface established for that virtual system's operator. Based on this information, the virtualized DAS operator interface generates the specific user interfaces and graphical display screens served to the operators. In the user interface displayed to an operator, that operator only sees information regarding their virtual system and the physical resources assigned to that virtual system. Alarms relevant to the virtual system are forwarded to the corresponding operator's network over the established operations and management channel (OMC). As shown at 340 with the method 300 a first virtualized DAS operator interface may be configured to manage a first set of the one or more physical resources assigned to a first virtual system in response to commands received from a first user via the at least one network interface and a second virtualized DAS operator interface may be configured to manage a second set of the one or more physical resources assigned to a second virtual system in response to commands received from a second user via the at least one network interface.

EXAMPLE EMBODIMENTS

Example 1 includes a distributed antenna system (DAS), the system comprising: a master unit configured to receive a base station downlink radio frequency signal from at least one base station, and configured to transmit a base station uplink radio frequency signal to the at least one base station; a plurality of remote antenna units that are each communicatively coupled to the master unit, the plurality of remote antenna units each configured to radiate a remote downlink radio frequency signal from at least one antenna into a coverage area and to receive a remote uplink radio frequency signal from the coverage area via the at least one antenna; and a controller configured to execute code for a DAS management virtualization system, wherein the DAS management virtualization system includes a virtual system controller function configured to establish a plurality of virtual systems and assign one or more physical resources of the DAS to each of the plurality of virtual systems; wherein the DAS management virtualization system includes a northbound interface driver that defines a first virtualized DAS operator interface configured to manage a first set of the physical resources assigned to a first virtual system, and defines a second virtualized DAS operator interface configured to manage a second set of the physical resources assigned to a second virtual system.

Example 2 includes the system of example 1, the DAS management system further comprising a first network interface coupled to the first virtualized DAS operator interface, and a second network interface coupled to a second virtualized DAS operator interface.

Example 3 includes the system of example 2, wherein the first network interface is configured to be accessed by a first network operator user, and wherein the second network interface is configured to be accessed by a second network operator user.

Example 4 includes the system of any of examples 2-3, wherein one or both of the first network interface and the second network interface comprise either a network adapter or a modem.

Example 5 includes the system of any of examples 1-4, wherein at least one physical resource of the DAS includes at least one shared physical resource assigned to both the first virtual system and the second virtual system.

Example 6 includes the system of any of examples 1-5, wherein at least one of the one or more physical resources of the DAS includes at least one non-shared physical resource exclusively assigned to either the first virtual system or the second virtual system.

Example 7 includes the system of any of examples 1-6 further comprising: a data model accessible by the virtual system controller function, wherein the data model includes resource definitions for the one or more physical resources of the DAS.

Example 8 includes the system of example 7, wherein the data model further comprises virtual system definitions that indicate which of the one or more physical resources of the DAS are assigned to each of the plurality of virtual systems.

Example 9 includes the system of any of examples 7-8, wherein the master unit comprises at least one wide-area integration node (WIN) coupled to a central area node (CAN).

Example 10 includes the system of example 9, wherein the plurality of remote antenna units each comprise an access point coupled to the central area node.

Example 11 includes the system of example 10, further comprising one or more transport extension nodes (TEN) coupled between the central area node and at least some of the remote antenna units.

Example 12 includes the system of any of examples 1-11, wherein the first virtualized DAS operator interface outputs information for displaying a graphical interface for the first virtual system via a first network interface to a first network operator; wherein the second virtualized DAS operator interface outputs information for displaying a graphical interface for the second virtual system via a second network interface to a second network operator.

Example 13 includes the system of example 12, wherein the graphical interface for the first virtual system includes a graphical representation of the first virtual system, and the graphical interface for the second virtual system includes a graphical representation of the second virtual system.

Example 14 includes the system of any of examples 12-13, wherein the DAS management virtualization system is configured to alter a configuration of the first virtual system in response to input from the first network operator received via the first virtualized DAS operator interface; wherein the virtual system controller function is configured to alter a configuration of the second virtual system in response to input from the second network operator received via the second virtualized DAS operator interface.

Example 15 includes the system of example 14, wherein the DAS management virtualization system is configured so that commands received via the first virtualized DAS operator cannot alter a configuration of the second virtual system, and commands received via the second virtualized DAS operator cannot alter a configuration of the first virtual system.

Example 16 includes the system of any of examples 12-15, wherein the alarms associated with the first virtual system are output from the first network interface to the first network operator, and alarms associated with the second virtual system are output from the second network interface to the second network operator.

Example 17 includes the system of any of examples 1-16, the northbound interface driver further comprising a DAS administrator interface coupled to a network interface.

Example 18 includes the system of any of examples 1-17, wherein the virtual system controller function, in response to an input from an operator of the first virtual system via the first virtualized DAS operator interface, is configured to define one or more signal sets for the first virtual system and assign the one or more signal sets to one or more of the remote antenna units assigned to the first virtual system.

Example 19 includes a management system for a distributed antenna system (DAS), wherein the DAS comprises the master unit and a plurality of remote antenna units coupled to the master unit, the system comprising: a controller; at least one network interface in communication with the controller; a data storage device storing a data model that includes at least resource definitions and virtual system definitions; wherein the controller is configured to execute a DAS management virtualization system configured to: execute a virtual system controller function to establish a plurality of virtual systems, wherein information defining of each of the plurality of virtual systems is stored in the virtual system definitions; assign one or more physical resources of the DAS to each of the plurality of virtual systems, wherein information defining each of the one or more physical resources of the DAS is stored in the resource definitions; execute a northbound interface driver to establish a plurality of virtualized DAS operator interfaces each associated with one of the virtual systems, wherein the plurality of virtualized DAS operator interfaces are communicatively coupled to the at least one network interface; wherein a first virtualized DAS operator interface is configured to manage a first set of the one or more physical resources assigned to a first virtual system in response to commands received from a first user via the at least one network interface; wherein a second virtualized DAS operator interface is configured to manage a second set of the one or more physical resources assigned to a second virtual system in response to commands received from a second user via the at least one network interface.

Example 20 includes the system of example 19, wherein the at least one network interface comprises either a modem or a network adapter.

Example 21 includes the system of any of examples 19-20, wherein commands received from the first user are received via a first network interface of the at least one network interface and commands received from the second user are received via an independent second network interface of the at least one network interface.

Example 22 includes the system of any of examples 19-21, wherein the one or more physical resources of the DAS includes at least one shared physical resource assigned to both the first virtual system and the second virtual system.

Example 23 includes the system of any of examples 19-22, wherein the one or more physical resources of the DAS includes at least one non-shared physical resource exclusively assigned to either the first virtual system or the second virtual system.

Example 24 includes the system of any of examples 19-23, wherein the master unit comprises at least one wide-area integration node (WIN) coupled to a central area node (CAN); and wherein the plurality of remote antenna units each comprise an access point coupled to the central area node.

Example 25 includes the system of example 24, further comprising one or more transport extension nodes (TEN) coupled between the central area node and at least some of the remote antenna units.

Example 26 includes the system of any of examples 19-25, wherein the first virtualized DAS operator interface outputs information for displaying a graphical interface for the first virtual system to the first user; wherein the second virtualized DAS operator interface outputs information for displaying a graphical interface for the second virtual system to the second user.

Example 27 includes the system of any of examples 19-26, wherein the DAS management virtualization system is configured so that commands received via the first virtualized DAS operator cannot alter a configuration of the second virtual system, and commands received via the second virtualized DAS operator cannot alter a configuration of the first virtual system.

Example 28 includes the system of any of examples 19-27, wherein alarms associated with the first virtual system are output from the first network interface to the first user, and alarms associated with the second virtual system are output from the second network interface to the second user.

Example 29 includes the system of any of examples 19-28, wherein the northbound interface driver further establishes a DAS administrator interface coupled to the at least one network interface.

Example 30 includes a method for distributed antenna system (DAS) management virtualization for a DAS comprising a master unit and a plurality of remote antenna units coupled to the master unit, the method comprising: executing a virtual system controller function to establish a plurality of virtual systems, wherein information defining of each of the plurality of virtual systems is stored in a data model; assigning one or more physical resources of the DAS to each of the plurality of virtual systems, wherein information defining each of the one or more physical resources of the DAS is stored in the data model; executing a northbound interface driver to establish a plurality of virtualized DAS operator interfaces each associated with one of the virtual systems, wherein the plurality of virtualized DAS operator interfaces are communicatively coupled to at least one network interface; wherein a first virtualized DAS operator interface is configured to manage a first set of the one or more physical resources assigned to a first virtual system in response to commands received from a first user via the at least one network interface; wherein a second virtualized DAS operator interface is configured to manage a second set of the one or more physical resources assigned to a second virtual system in response to commands received from a second user via the at least one network interface.

In various alternative embodiments, system and/or device elements, method steps, or example implementations described throughout this disclosure (such as any of the master units, remote antenna units, access points, WIN, CAN, TEN, controllers, circuits, modems, network interfaces, DAS management system, DAS management virtualization system, base stations, terminal, databases, or subparts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, DAS related terms such as "master unit", "remote unit", "remote antenna unit", "controller", "circuit", "circuitry", "interface", "detector", "sensor", "attenuator", "processor", "base station", "amplifier", "terminal", "database", and "modem" refer to the names of hardware elements that would be recognized and understood by those of skill in the art of wireless communications and are not used herein as generic placeholders, nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A distributed antenna system (DAS), the system comprising:
   a master unit configured to receive a base station downlink radio frequency signal from at least one base station, and configured to transmit a base station uplink radio frequency signal to the at least one base station;
   a plurality of remote antenna units that are each communicatively coupled to the master unit, the plurality of remote antenna units each configured to radiate a remote downlink radio frequency signal from at least one antenna into a coverage area and to receive a remote uplink radio frequency signal from the coverage area via the at least one antenna; and
   a controller configured to execute code for a DAS management virtualization system, wherein the DAS management virtualization system includes a virtual system controller function configured to establish a plurality of virtual systems and assign one or more physical resources of the DAS to each of the plurality of virtual systems;
   wherein the DAS management virtualization system includes a northbound interface driver that defines a first virtualized DAS operator interface configured to manage a first set of the one or more physical resources assigned to a first virtual system, and defines a second virtualized DAS operator interface configured to manage a second set of the one or more physical resources assigned to a second virtual system.

2. The system of claim 1, the DAS management virtualization system further comprising a first network interface coupled to the first virtualized DAS operator interface, and a second network interface coupled to the second virtualized DAS operator interface.

3. The system of claim 1, wherein at least one physical resource of the DAS includes at least one shared physical resource assigned to both the first virtual system and the second virtual system.

4. The system of claim 1 further comprising:
   a data model accessible by the virtual system controller function, wherein the data model includes resource definitions for the one or more physical resources of the DAS.

5. The system of claim 4, wherein the data model further comprises virtual system definitions that indicate which of the one or more physical resources of the DAS are assigned to each of the plurality of virtual systems.

6. The system of claim 1, wherein the master unit comprises at least one wide-area integration node (WIN) coupled to a central area node (CAN);
   wherein the plurality of remote antenna units each comprise an access point coupled to the central area node.

7. The system of claim 6, further comprising one or more transport extension nodes (TEN) coupled between the central area node and at least some of the remote antenna units.

8. The system of claim 1, wherein the first virtualized DAS operator interface outputs information for displaying a graphical interface for the first virtual system via a first network interface to a first network operator;
   wherein the second virtualized DAS operator interface outputs information for displaying a graphical interface for the second virtual system via a second network interface to a second network operator.

9. The system of claim 8, wherein the graphical interface for the first virtual system includes a graphical representation of the first virtual system, and the graphical interface for the second virtual system includes a graphical representation of the second virtual system.

10. The system of claim 8, wherein the DAS management virtualization system is configured to alter a configuration of the first virtual system in response to input from the first network operator received via the first virtualized DAS operator interface;
    wherein the virtual system controller function is configured to alter a configuration of the second virtual system in response to input from the second network operator received via the second virtualized DAS operator interface.

11. The system of claim 10, wherein the DAS management virtualization system is configured so that commands received via the first virtualized DAS operator cannot alter a configuration of the second virtual system, and commands received via the second virtualized DAS operator cannot alter a configuration of the first virtual system.

12. The system of claim 1, wherein the virtual system controller function, in response to an input from an operator of the first virtual system via the first virtualized DAS operator interface, is configured to define one or more signal sets for the first virtual system and assign the one or more signal sets to one or more of the remote antenna units assigned to the first virtual system.

13. A management system for a distributed antenna system (DAS), wherein the DAS comprises a master unit and a plurality of remote antenna units coupled to the master unit, the system comprising:
    a controller;
    at least one network interface in communication with the controller; and
    a data storage device storing a data model that includes at least resource definitions and virtual system definitions;
    wherein the controller is configured to execute a DAS management virtualization system configured to:
       execute a virtual system controller function to establish a plurality of virtual systems, wherein information defining of each of the plurality of virtual systems is stored in the virtual system definitions;
       assign one or more physical resources of the DAS to each of the plurality of virtual systems, wherein information defining each of the one or more physical resources of the DAS is stored in the resource definitions;
       execute a northbound interface driver to establish a plurality of virtualized DAS operator interfaces each associated with one of the virtual systems, wherein the plurality of virtualized DAS operator interfaces are communicatively coupled to the at least one network interface; and
    wherein a first virtualized DAS operator interface is configured to manage a first set of the one or more physical resources assigned to a first virtual system in response to commands received from a first user via the at least one network interface;
    wherein a second virtualized DAS operator interface is configured to manage a second set of the one or more physical resources assigned to a second virtual system in response to commands received from a second user via the at least one network interface.

14. The system of claim 13, wherein commands received from the first user are received via a first network interface of the at least one network interface and commands received from the second user are received via an independent second network interface of the at least one network interface.

15. The system of claim 13, wherein the one or more physical resources of the DAS includes at least one shared physical resource assigned to both the first virtual system and the second virtual system.

16. The system of claim 13, wherein the master unit comprises at least one wide-area integration node (WIN) coupled to a central area node (CAN); and
  wherein the plurality of remote antenna units each comprise an access point coupled to the central area node.

17. The system of claim 16, further comprising one or more transport extension nodes (TEN) coupled between the central area node and at least some of the remote antenna units.

18. The system of claim 13, wherein the first virtualized DAS operator interface outputs information for displaying a graphical interface for the first virtual system to the first user;
  wherein the second virtualized DAS operator interface outputs information for displaying a graphical interface for the second virtual system to the second user.

19. The system of claim 13, wherein the DAS management virtualization system is configured so that commands received via the first virtualized DAS operator cannot alter a configuration of the second virtual system, and commands received via the second virtualized DAS operator cannot alter a configuration of the first virtual system.

20. A method for distributed antenna system (DAS) management virtualization for a DAS comprising a master unit and a plurality of remote antenna units coupled to the master unit, the method comprising:
  executing a virtual system controller function to establish a plurality of virtual systems, wherein information defining of each of the plurality of virtual systems is stored in a data model;
  assigning one or more physical resources of the DAS to each of the plurality of virtual systems, wherein information defining each of the one or more physical resources of the DAS is stored in the data model;
  executing a northbound interface driver to establish a plurality of virtualized DAS operator interfaces each associated with one of the virtual systems, wherein the plurality of virtualized DAS operator interfaces are communicatively coupled to at least one network interface; and
  wherein a first virtualized DAS operator interface is configured to manage a first set of the one or more physical resources assigned to a first virtual system in response to commands received from a first user via the at least one network interface;
  wherein a second virtualized DAS operator interface is configured to manage a second set of the one or more physical resources assigned to a second virtual system in response to commands received from a second user via the at least one network interface.

* * * * *